No. 12,162. REISSUED OCT. 13, 1903.

W. F. WARNER.

POLE CHANGER.

APPLICATION FILED DEC. 9, 1902.

3 SHEETS—SHEET 1.

Witnesses
Frank A. Fahle
J. A. Walsh.

Inventor
William F. Warner
By
Bradford & Hood,
Attorneys

No. 12,162.

REISSUED OCT. 13, 1903.

W. F. WARNER.

POLE CHANGER.

APPLICATION FILED DEC. 9, 1902.

3 SHEETS—SHEET 2.

Witnesses
Frank A. Fahle
J. A. Walsh

Inventor
William F. Warner
By
Bradford & Hood.
Attorneys

No. 12,162. REISSUED OCT. 13, 1903.

W. F. WARNER.

POLE CHANGER.

APPLICATION FILED DEC. 9, 1902.

3 SHEETS—SHEET 3.

Witnesses

Frank A. Fahle

J. A. Walsh.

Inventor

William F. Warner

By

Bradford & Hood,

Attorneys

No. 12,162. Reissued October 13, 1903.

UNITED STATES PATENT OFFICE.

WILLIAM F. WARNER, OF MUNCIE, INDIANA, ASSIGNOR TO THE WARNER ELECTRIC COMPANY, OF MUNCIE, INDIANA.

POLE-CHANGER.

SPECIFICATION forming part of Reissued Letters Patent No. 12,162, dated October 13, 1903.

Original No. 685,887, dated November 5, 1901. Application for reissue filed December 9, 1902. Serial No. 134,588.

*To all whom it may concern:*

Be it known that I, WILLIAM F. WARNER, a citizen of the United States, residing at Muncie, in the county of Delaware and State of Indiana, have invented certain new and useful Improvements in Pole-Changers, of which the following is a specification.

My present invention relates to a machine for alternating or changing the polarity of an electric current which, although capable of use in many situations, particularly wherever electric signaling is to be done, is especially designed for use in connection with telephone-exchanges to furnish an alternating current of electricity with which to ring their polarized bells, the current being derived from any appropriate source of electrical energy, such as suitable batteries.

The capabilities, objects, and advantages of my invention will hereinafter appear. Said invention consists both in features of particular construction and arrangement and in the assemblage and combination of various electrical and mechanical devices whereby the advantageous results specified may be attained, as will be hereinafter more particularly described and claimed.

Figure 1:
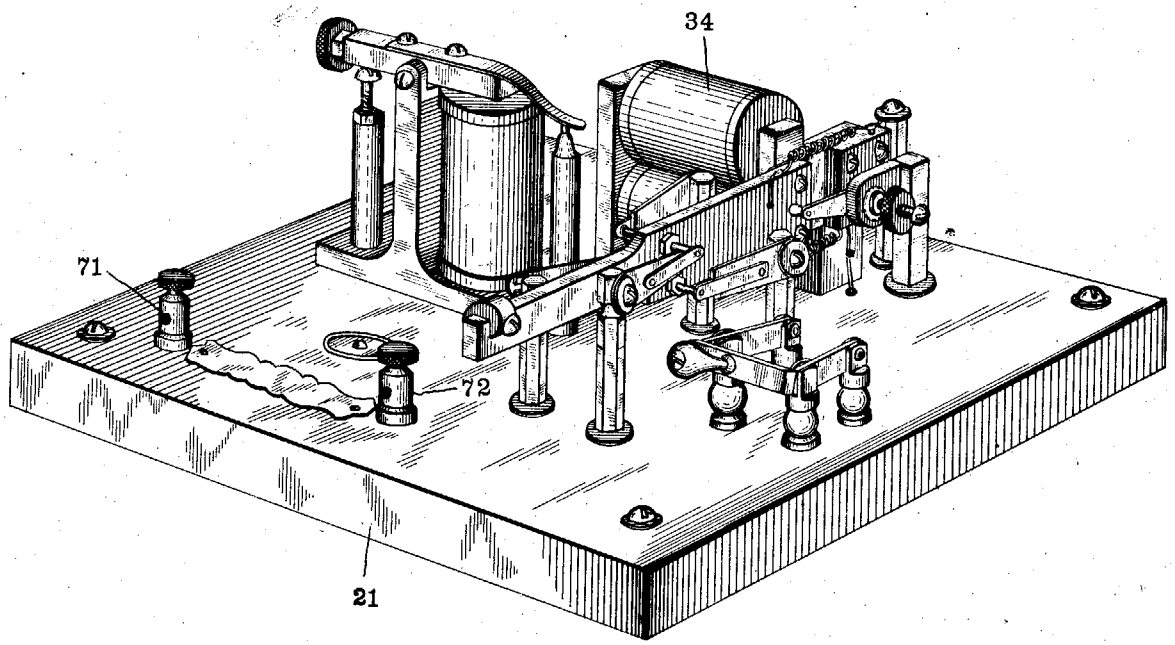
Figure 2:
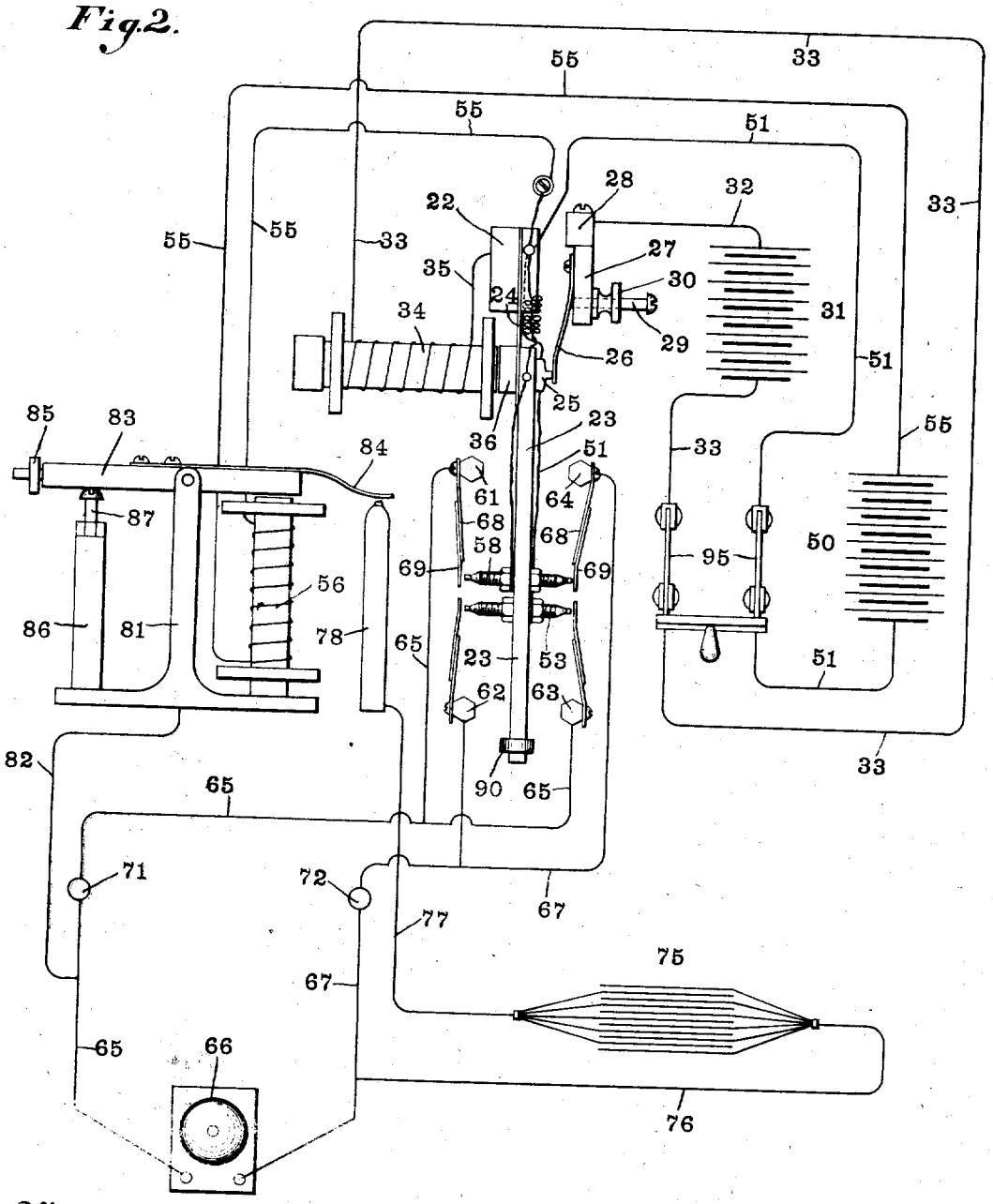
Figure 3:
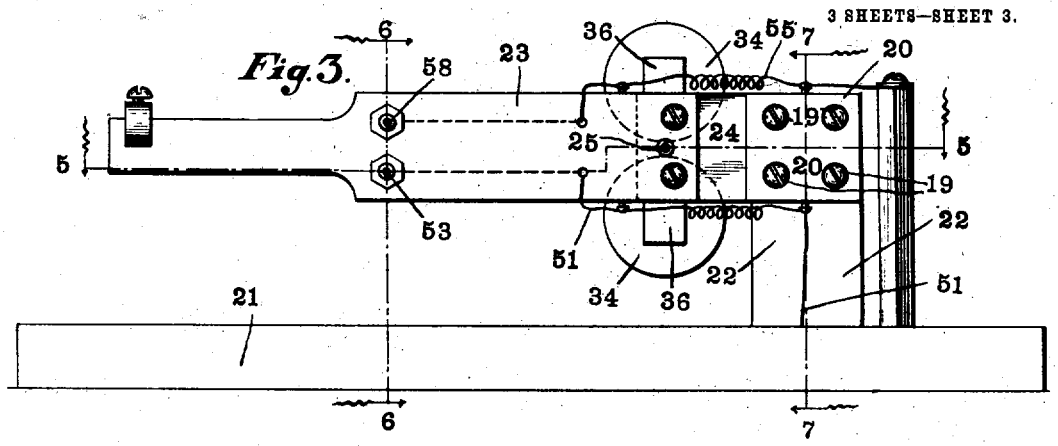
Figure 4:
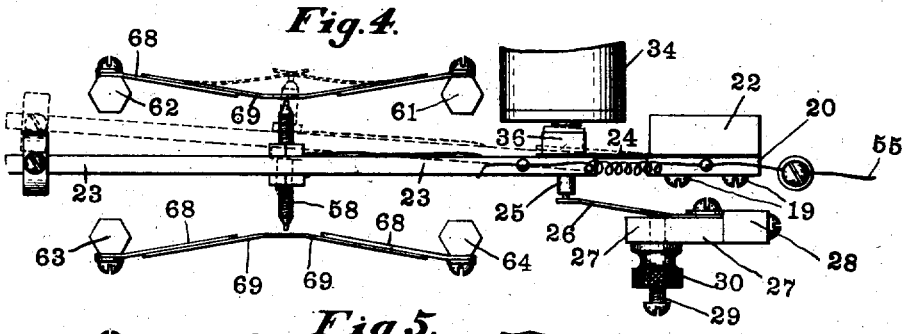
Figure 5:
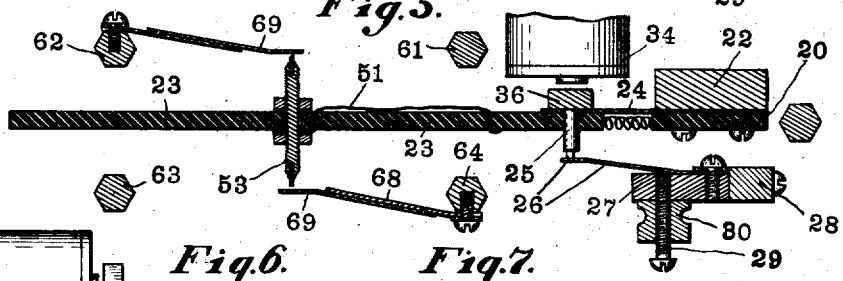
Figure 6:
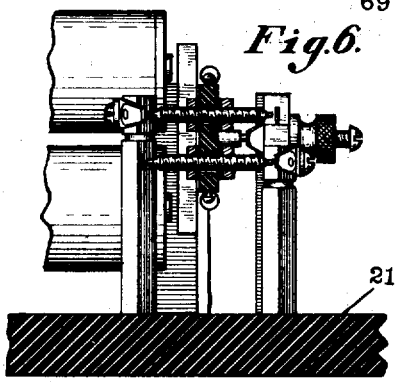
Figure 7:
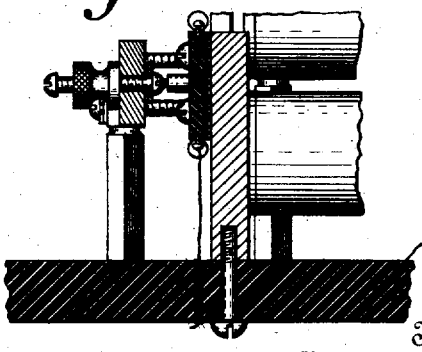

Referring to the accompanying drawings, which are made a part hereof, and on which similar reference characters indicate similar parts, Figure 1 is a perspective view of a pole-changer embodying one form of my invention. Fig. 2 is a diagrammatic view showing particularly one suitable arrangement of electrical circuits and connections in an apparatus wherein my invention is employed; Fig. 3, a side elevation of the vibrating arm of such an apparatus and immediately-adjacent parts on a considerably-enlarged scale; Fig. 4, a top or plan view of said arm and the adjacent parts, including substantially the same features shown in Fig. 3; Fig. 5, a horizontal sectional view as seen when looking downwardly from the arrows, indicated by the line 5 5 in Fig. 3; and Figs. 6 and 7, transverse vertical sectional views as seen when looking in the directions indicated by the arrows from the dotted lines 6 6 and 7 7, respectively, in Fig. 3.

In producing my machine commercially I provide a suitable base 21, upon which various of the devices embodied in my apparatus are mounted, such as supports for the electrical and moving parts. A post 22 is shown as a principal one of these supports, and upon this I mount a vibrating arm 23, preferably using a thin metallic (and consequently flexible) connecting-piece 24, which is firmly united to both the arm and to the post or support, (by screws or otherwise,) the arm itself being preferably formed of non-conducting material, so that the electrical parts attached or adjacent thereto may be insulated. At or near the rear end of this arm 23 is a contact member 25, which in the arrangement shown is electrically connected to the flexible metallic portion 24 and is adapted as the arm vibrates to come in contact with another contact member 26, which is carried on an arm 27, extending out from a post or support 28. This contact member 26 is adjustable, its adjustment being effected by means of a screw 29, the latter being held to adjusted position by a jam-nut 30. The support 27 28 is connected to one pole of a battery 31, and a wire 33 runs from the other pole of said battery to an electromagnet 34, and said magnet is connected to the support 22 by a wire 35. An armature 36 to the magnet 34 is mounted on the arm 23 and is electrically connected to the contact member 25. By this arrangement it will be readily seen that I have an ordinary circuit-breaker for vibrating the arm. The course of the current is through the magnet 34, the wire 35, the post 22, the flexible metallic connecting-piece 24, the contact members 25 and 26, and the support 27 28 to the battery. This acts to energize the magnet, moving the arm to the left, but breaking the circuit, which causes the magnet to become inoperative, whereupon the spring flexible connecting-piece 24 moves the arm to the right, causing it to resume its normal position and reëstablish the circuit. This movement may continue indefinitely, thus enabling my device to operate continuously, if desired. I have shown another battery 50 as the source of electrical energy from which comes the continuous current, which by means of my device is transformed into an alternating current, and while I prefer to use such a battery on account of its convenience and low cost, yet I desire it to be understood that any convenient form of primary or secondary battery or other suitable means for generating electrical current or source of electrical energy may be employed and that the term "battery" or "batteries" as used in this specification is intended to comprehend and include not only an ordinary battery, but all other such means or sources.

A wire 51 runs from the battery 50 to the support 22 and is there appropriately secured, and from thence passes to the arm 23 at or near its point of least motion, and thence along said arm and is connected to the contact member 53. Extending from the other pole of the battery 50 is a wire 55, which extends to and is wound about the magnet 56 of the relay, (hereinafter described,) and thence to the support 22, passing to the arm 23 at or near the point of least motion, and thence along said arm to where it is connected to the contact member 58. The means which I have shown for securing the flexible connecting-piece 24 to the main post or support 22 consists of a block 20 of wood or other non-conducting material, which is held to said post or support by screws 19. As most plainly shown in Fig. 3, both the wires 51 and 55 run first to and are supported by this block and pass thence below and above the flexible metallic connecting-piece 24, and at a point beyond said connecting-piece are attached to the arm 23. They are thus completely insulated from the metallic portion in a very convenient manner, although the particular method of leading these wires to the arm is not important so long as they are attached thereto at or near the point of least motion. As is also shown in the drawings, (best in Fig. 3,) these wires are formed in coils where they pass under and above the flexible metallic portion 24. This is a very simple way of providing for taking up the slack in the wires due to the change of position as the arm vibrates. The flexibility of the wires will correspond with the flexibility of the flexible metallic portion of the arm, so as not to hinder the vibration of the arm, while the wires are easily kept in proper position and free from electrical contact with adjacent parts. This arrangement also (as the bending of any part of the wire in the coils is almost infinitesimal) obviates the danger of crystallization and breaking of the wires in long-continued use. The great advantage, however, of the particular arrangement of conducting the wires to the arm is, as above stated, due to the fact that they are thus connected at substantially the point of least motion, while the motion at the point where the contact members are mounted on the arm may be made as great as is desired without being in any way limited or interfered with because of the wire connections. The construction which I prefer for these contact members 53 and 58 is to form the bodies thereof as a continuous screw-threaded rod passing through the arm and extending to substantially equal distances on each side thereof and secured to said arm by nuts screwed up tightly against the sides of said arms, as shown, although I do not desire to limit myself to this particular construction. These contact members and also the contact member 25 preferably terminate in small pieces of platinum, such platinum pieces being the small points shown in the drawings.

On the opposite sides of the arm 23 are shown four posts or supports 61, 62, 63, and 64. For purposes of convenience I will describe the arrangement of wiring shown in Fig. 2 in explaining the operation of changing the continuous current from the batteries to alternating currents. Referring now particularly to said Fig. 2, it will be seen that the posts 61 and 63 are connected together by branches of one wire 65, which extends through the switchboard in the central office to the bell or annunciator 66. The posts 62 and 64 are electrically connected by branches of another wire 67, likewise leading to the switchboard in the central office, and thence to the bell or annunciator. Secured to each of the said four posts or supports is a plate or arm extending outwardly toward the contact members carried by the vibrating arm 23 and terminating in a flexible or yielding portion or brush. These arms for purposes of convenience of construction are shown in two parts, each arm being composed of the parts 68 and 69, the first of which in the form shown is comparatively stiff, while the latter is comparatively flexible. As in many other particulars, however, this construction can be varied, as desired. These brushes or contact members are sufficiently flexible so that they will yield considerably when the arm 23 is vibrating (see especially Fig. 4) and the contact members carried thereon come in contact with the brushes. As the arm in the arrangement shown is intended to vibrate continuously, the importance of the yielding flexible brushes or contact members and platinum bearings will become apparent. The yielding contact members reduce the friction to a minimum, making the device practically indestructible and one that will operate indefinitely without repairs.

The arrangement here spoken of is one of the important features of my invention. As has heretofore been stated, the arm 23 is carried by a fixed support 22, which is a certain distance from the contact members now under discussion, a part of which is carried by said arm. The other contact members, as has just been described, are, in the construction shown, carried by the posts or supports 61, 62, 63, and 64, which are differently positioned relatively to the points of contact than the support for the arm. Both the arm and the contacts not carried thereby being yielding or movable, these differing points of support cause different motions where the contact members engage, so that said contact members slide one upon the other, producing what I have denominated "sliding contacts," whereby the contact members are kept clean and bright, so that sparking, due to any creation or accumulation of foreign matter, is effectually prevented. The different positioning of these points of support resulting in different paths of motion of the parts is therefore of considerable importance.

Referring now again to Fig. 2 and bearing in mind that one contact member 58 is connected to one pole of the battery 50, as the positive, and that the contact member 53 is connected to the negative pole of the same battery, and assuming that the arm 23 is moved to the left, thereby connecting the wire 65 to the positive pole and the wire 67 to the negative pole, a positive current will be sent to the central office, thence through the bell or annunciator 66, returning through the wire 67. When the arm is moved to the right, making a connection with the supports 63 and 64, the positive contact member 58 will connect with the wire 67, so that the direction of current will be reversed, passing through wire 67 to the central office, from whence it is sent to the annunciator or bell 66, and thence through the wires 65 to the contact member 53, thereby alternating the direction of currents in both wires 65 and 67 at each vibration of the arm. These wires are shown as running to ordinary binding-posts 71 and 72; but it is to be understood that the wire 67 could be grounded in case it is desired. These binding-posts, let it be understood, are the circuit-terminals, so far as my device is concerned, as is plainly shown in Fig. 1, and the continuation of the circuit to the bell, as indicated in Fig. 2, is merely for the purpose of illustrating an apparatus operatively complete. This particular arrangement of posts, brushes, and wiring is, however, immaterial so long as the positive pole is connected to one wire and the negative pole to the other wire when the arm is moved to one position and vice versa when the arm is moved to the opposite position.

I find it desirable in the use of my device to employ a condenser 75 to prevent sparking and also to prevent induction or noise in lines adjacent to those signaled over. The condenser is not normally electrically included in the circuit embodying the wires 65 and 67, but is automatically electrically connected by means of a relay when said wires are connected and in use and when so connected operates in the usual manner. One end of the condenser is connected by the wire 76 to the wire 67, and the other end of the condenser is connected, by means of a wire 77, to a metallic post 78. The relay consists of a standard 81, resting on the base 21. The standard is connected to the wire 65 by means of a wire 82. On top of the standard is pivoted an armature 83, to the forward portion of which is secured a spring contact-arm 84, which extends out over the post 78, but is normally out of contact therewith. On the other end of the armature is located an adjustable counterweight 85. Below this end of the armature is a supporting-post 86, which can be varied in height by means of a screw 87, which is screwed into the top of said post. As heretofore stated, the relay-magnet 56 is included in the circuit of which the wire 55 forms a part and which wire is connected to one of the poles of the signaling-battery. With this arrangement when a circuit is established through the wires 65 and 67 and the magnet 56 is energized by the circuit in which it is included said magnet will draw down the armature 83, so that the spring 84 will bear against the post 78, making a circuit through the condenser, as will be clearly seen upon an inspection of Fig. 2 of the drawings, the current first passing over the wire 67 to the wire 76, through the condenser, and from the condenser through the wire 77, post 78, spring-arm 84, post 81, and wire 82 to the wire 65 of the signaling-circuit. When the current from the batteries is broken, the armature will be released from the magnet and the counterweight will cause the armature to drop into contact with the adjacent screw 87, separating the spring-arm 84 from the post 78 and breaking the circuit leading to the condenser.

It is desirable to variably govern the speed of the vibrating arm. For this purpose I provide an adjustable weight 90 on the outwardly-extending end of said arm, which may be adjusted nearer to or farther from the point of support, according as a faster or slower speed is desired.

I have also provided an ordinary switch for the usual purpose of breaking the circuits and cutting out the batteries. This switch 95 is shown as a double switch capable of cutting both circuits at once.

The drawings illustrate the apparatus as I have made and used it. It will, however, be understood that many changes can be made in the construction and arrangement of the parts and in the wiring of the different portions of my device without in the least departing from the nature and purpose of my invention.

Having thus fully described my said invention, what I claim as new, and desire to secure by Letters Patent, is—

1. In a pole-changer, the combination with a support, of a vibrating arm secured to the support, means for automatically vibrating the arm, a ringing-battery, a pair of wires in the ringing-battery circuit carried by the arm, one wire connected to each pole respectively of the ringing-battery, contact-points arranged in pairs, each pair projecting from opposite sides of the arm, each pair of points acting as a terminal for each wire respectively, a pair of brushes on each side of the arm each pair adapted to alternately contact with the contact-points, a pair of exchange-wires, and branch wires connecting the exchange-wires to the brushes so that each exchange-wire will alternately be connected to each pair of contact-points on the arm and an annunciator in the battery-circuit.

2. In a pole-changer, the combination with a support, of a vibrating arm secured to the support, a ringing-battery, a wire connected to each pole of the ringing-battery, the wires secured to and carried by the arm, a terminal contact-point carried by the arm for each wire, means for changing the continuous current at the contact-points to an alternating current, a circuit-breaker for automatically vibrating the arm, and a separate battery for actuating the same and an annunciator in the battery-circuit.

3. In a pole-changer, the combination with a support, of a vibrating arm having a flexible metallic end secured to the support, a circuit-breaker for vibrating the arm, the metallic portion of the arm acting as a conductor for the circuit-breaker current, a ringing-battery, a wire connected to each pole of the ringing-battery, the wires carried by the arms and insulated from the metallic portion thereof, a terminal contact-point carried by the arm for each wire, and means for changing the continuous current at the contact-points to an alternating current and an annunciator in the battery-circuit.

4. In a pole-changer, the combination with a support, of a vibrating arm having a flexible metallic end secured to the support, a circuit-breaker for vibrating the arm, the metallic portion of the arm acting as a conductor for the circuit-breaker current, a ringing-battery, a wire connected to each pole of the ringing-battery, the wires carried by the arms and insulated from the metallic portion thereof and formed in a coil at the metallic portion, a terminal contact-point carried by the arm for each wire, and means for changing the continuous current at the contact-points to an alternating current and an annunciator in the battery-circuit.

5. In a pole-changer, the combination with a support, of a vibrating arm secured to the support provided with a flexible portion, mechanism for vibrating the arm, a ringing-battery, a wire connected to each pole of the ringing-battery, the wires carried by the arm and formed in a coil at the flexible portion, a terminal contact-point carried by the arm for each wire, and means for changing the continuous current at the contact to an alternating current and an annunciator in the battery-circuit.

6. In a pole-changer, the combination with a vibrating arm, means for automatically vibrating the arm, a ringing-battery, wires to the opposite poles of the battery carried by the arm, a terminal contact-point carried by the arm for the wires, and a yielding flexible brush located adjacent the side of the arm and with which the contact-point on the arm is adapted to contact and an annunciator in the battery-circuit.

7. In a pole-changer, the combination with a vibrating arm, of means for automatically vibrating the arm, a ringing-battery, wires connected to the opposite poles of the battery carried by the arm, a terminal contact-point carried by the arm for the wires, a platinum tip for the contact-point, and a yielding flexible brush located adjacent the side of the arm and with which the contact-point of the arm is adapted to contact, and a platinum bearing or contact-point located near the end of the brush and an annunciator in the battery-circuit.

8. In a pole-changer, the combination with a support, of a vibrating arm secured to the support, means for automatically vibrating the arm, a ringing-battery, a pair of wires in the ringing-battery circuit carried by the arm, one wire connected to each pole respectively of the ringing-battery, contact-points arranged in pairs, each pair projecting from opposite sides of the arm, each pair of points acting as a terminal for each wire respectively, a pair of posts located adjacent to and on opposite sides of the arm, plates supported by the posts, the plates on each side of the arm projecting toward each other, flexible yielding brushes secured to the plates and extending therefrom, and arranged in the line of travel of the contact-points when the arm is vibrating and an annunciator in the battery-circuit.

9. In a pole-changer, the combination with a ringing-battery generating a continuous current and an annunciator, of means for changing the continuous current to an alternating current, a condenser and means for automatically connecting the condenser across the ringing-circuit at the time of ringing.

10. In a pole-changer, the combination with a ringing-battery generating a continuous current and an annunciator, of means for changing the continuous current to an alternating current, a condenser, means for automatically connecting the condenser across the ringing-circuit at the time of ringing, and a wire leading from each pole of the ringing-battery to the changing means, one wire actuating the connecting means for the condenser.

11. In a pole-changer, the combination with a ringing-battery generating a continuous current and an annunciator, of means for changing the continuous current to an alternating current, a condenser, means for automatically connecting the condenser across the ringing-circuit at the time of ringing, the said means consisting of a vertical magnet, a metallic standard, an armature pivoted on top of the standard extending over the magnet, a connecting-post, a spring contact-arm secured to the armature and extending over the post.

12. The combination, in a pole-changer, of a support, a vibrating arm secured to the support, means for automatically vibrating the arm, circuit-wires running to said arm at or near the point of least motion and extending thence along and carried by said arm and terminating in contact members also carried by said arm, and other suitable contact members also forming terminals of circuit-wires and located opposite the contact members carried by the arm with which they will engage as the arm is vibrated.

13. The combination, in a pole-changer, of a support, a vibrating arm secured to the support by means of a flexible connecting-piece, means for automatically vibrating the arm, circuit-wires running to said arm at or near the point of least motion and extending thence along and carried by said arm and terminating in contact members also carried by said arm, and other suitable contact members also forming terminals of circuit-wires and located opposite the contact members carried by the arm with which they will engage as the arm is vibrated.

14. The combination, in a pole-changer, of a support, a vibrating arm secured to the support by means of a flexible connecting-piece set vertically whereby horizontal but not vertical swing is permitted, means for automatically vibrating the arm, circuit-wires running to said arm at or near the point of least motion and extending thence along and carried by said arm and terminating in contact members also carried by said arm, and other suitable contact members also forming terminals of circuit-wires and located opposite the contact members carried by the arm with which they will engage as the arm is vibrated.

15. The combination, in a pole-changer, of a support, a vibrating arm secured to the support, means for automatically vibrating the arm, a battery, a wire connected to each pole thereof, wires leading to terminal contact members carried by the arm, other contact members positioned to contact therewith as the arm vibrates, means for changing the continuous current at the contact-points into an alternating current, an annunciator in the battery-circuit, and means for regulating the speed of the vibrating arm.

16. The combination, in a pole-changer, of a support, a vibrating arm secured to the support, means for automatically vibrating the arm, a battery, a wire connected to each pole thereof, wires leading to terminal contact members carried by the arm, other contact members situated in the path of said contact-points, means for changing the continuous current at the points of contact into an alternating current, and an annunciator in the battery-circuit.

17. The combination, in a pole-changer, of a support, a vibrating arm secured to the support, means for automatically vibrating the arm, a battery, a wire connected to each pole thereof, wires leading to terminal contact members carried by the arm, other contact members positioned to contact therewith as the arm is vibrated, means for changing a continuous current at the contact-points into an alternating current, an annunciator in the battery-circuit, and a relay in the battery-circuit.

18. The combination, in a pole-changer, of a support, a vibrating arm carried by the support, means for vibrating the arm, suitable electrical circuits, contact members in said circuits carried by said arm, other contact members arranged adjacent to said arm and in the path of the contact members thereon as the arm is vibrated, means for changing a direct current into an alternating current, an annunciator-circuit, and a condenser across said circuit.

19. The combination, in a pole-changer, of a support, a vibrating arm secured to the support, a circuit-breaker for vibrating the arm, a battery, a wire connected to each pole thereof, wires leading to terminal contact members carried by the arm, other contact members positioned in the path of the contact members on the arm, means for changing a continuous current at the contact-points into an alternating current, an annunciator in the battery-circuit, a condenser, and means for cutting in said condenser across the battery-circuit at the time of signaling.

20. The combination, in a pole-changer, of a support, a vibrating arm secured to the support, means for vibrating the arm, a battery, a wire connected to each pole thereof, wires leading to terminal contact members carried by the arm, other contact members positioned to contact therewith as the arm vibrates, means for changing the continuous current at the contact-points into an alternating current, an annunciator in the battery-circuit, a relay in the battery-circuit, a condenser, and means for cutting said condenser into said battery-circuit at the time of signaling.

In witness whereof I have hereunto set my hand, at Muncie, Indiana, this 22d day of November, A. D. 1902.

WILLIAM F. WARNER.

Witnesses:
HARRIETTE JOHNSON,
STELLA TEGARDEN.